Jan. 9, 1968 D. A. EDGECOMBE 3,362,205
EXTRUSION APPARATUS

Original Filed May 26, 1964

INVENTOR.
David A. Edgecombe
BY
ATTORNEY

Jan. 9, 1968   D. A. EDGECOMBE   3,362,205
EXTRUSION APPARATUS

Original Filed May 26, 1964   4 Sheets-Sheet 2

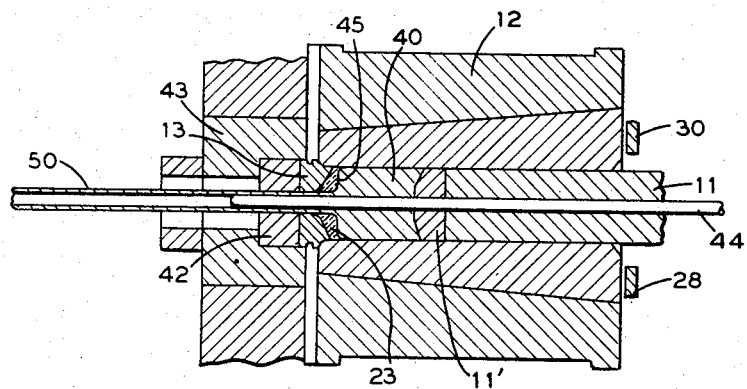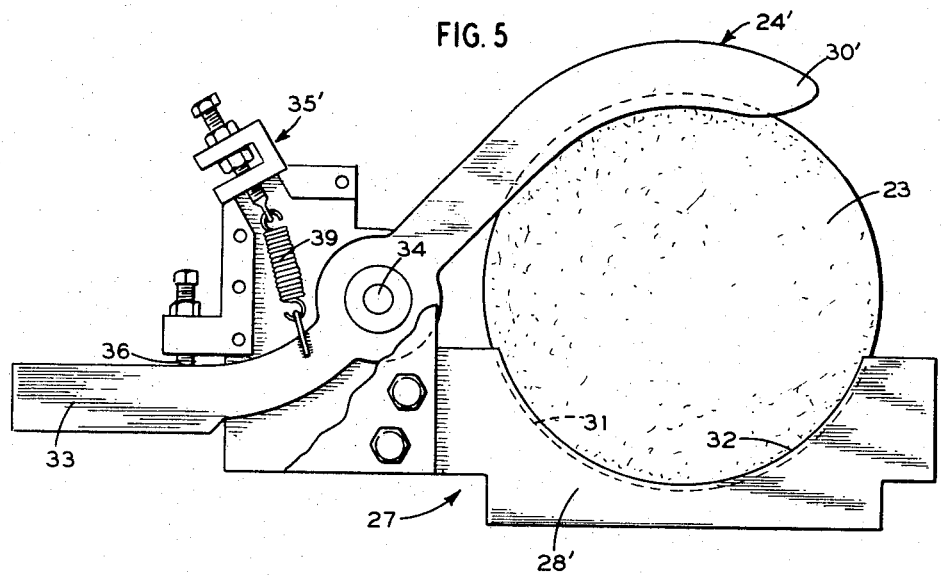

Jan. 9, 1968   D. A. EDGECOMBE   3,362,205
EXTRUSION APPARATUS

Original Filed May 26, 1964   4 Sheets-Sheet 4

# United States Patent Office 3,362,205
Patented Jan. 9, 1968

3,362,205
EXTRUSION APPARATUS
David A. Edgecombe, Beaver Falls, Pa., assignor to The Babcock & Wilcox Company, New York, N.Y., a corporation of New Jersey
Continuation of application Ser. No. 370,206, May 26, 1964. This application Apr. 19, 1967, Ser. No. 632,107
4 Claims. (Cl. 72—253)

ABSTRACT OF THE DISCLOSURE

The instant invention discloses rotatable arm means to position a lubricating disk at one end of the chamber of an extrusion press and ram means for pushing a billet and said disk into said extrusion chamber to extrude said billet through a die at the other end of said chamber.

---

Figure 1:
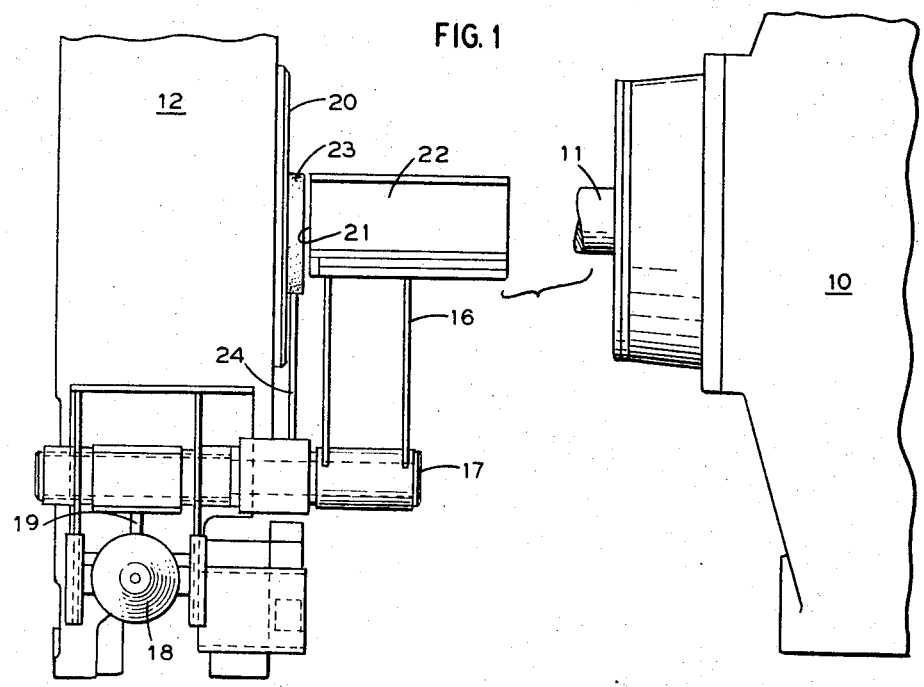

This application is a continuation of application Ser. No. 370,206, filed May 26, 1964, now abandoned.

This invention relates to the extrusion of metals having relatively high melting temperatures, such as carbon and alloy steels, and the like, wherein a relatively refractory material, such as glass, is interposed between the metal and the extrusion press parts to serve as a lubricant. More particularly, the invention relates to an improved method of and apparatus for applying a lubricant to a work piece during the extrusion of billets to reduce the time required to produce an extruded product, thereby producing a series of extrusions and thereby reducing the cost of extruding high melting temperature metals.

In the extrusion of such metals, the billets are heated to a temperature of the order of 2300° F. in a heating furnace or in a heating bath, such as a molten salt bath, prior to being charged into the extrusion press. After removal from the heating means for transfer to the extrusion press, the billets may have at least their external circumferential surface coated with a layer of refractory lubricating material having the property of becoming and remaining viscous at the extrusion temperature. In the case of tubular or axially pierced or drilled billts used for tubular extrusions, the internal surface of the billet may be similarly coated before the billet is charged into the billet receiving chamber of the extrusion press container. Before each of the billets is charged into the press, a plate, disk, plug or block of such refractory material is placed in position adjacent the face of the chamber at the entrance end of the container.

Heretofore the plate, disk, plug or block of refractory material has been positioned manually within the extrusion chamber against the face of the extrusion die immediately prior to the insertion of the hot billet into the container. Performing this step has been hazardous, time consuming and entirely unsatisfactory when operating the extrusion press on a commercial basis. Attempts to mechanize the operation of separately inserting the disk of lubricant into the extrusion chamber have not been successful due to the difficulty in manipulating the disk in the space available. Unexpectedly, I have found that the procedure can be carried out very simply by positioning the disk or plug in alignment with the extrusion chamber and simultaneously inserting both the lubricating disk and the billet into the extrusion chamber. The initial contact between the lubricating disk and the hot billet causes some adhesion between the surfaces which helps the disk and the billet to pass simultaneously into the chamber without difficulty. Under these circumstances the disk is well centered and is effectively located for the extrusion operation.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Figure 2:
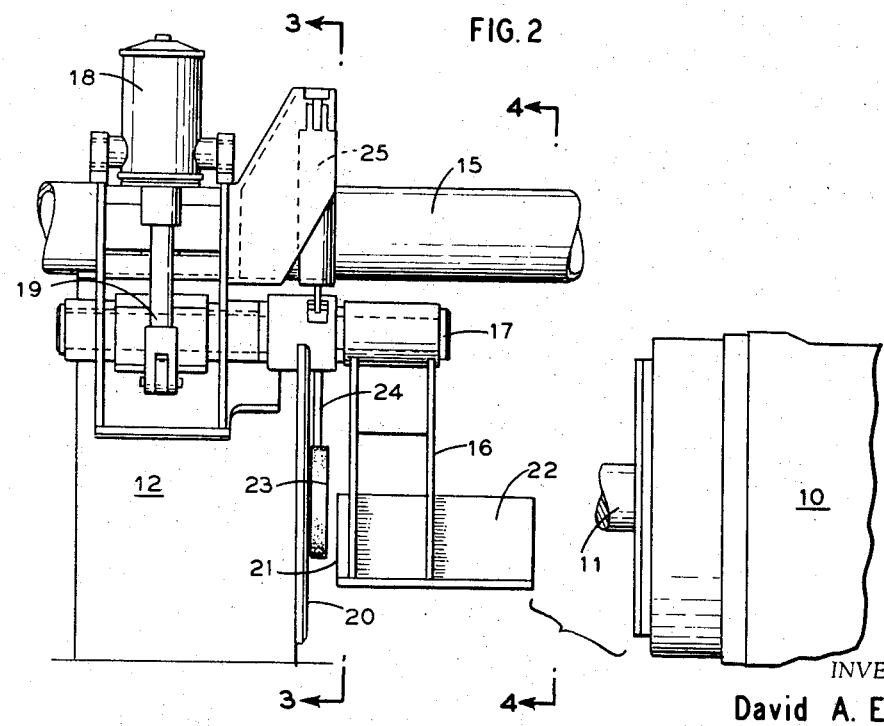
Figure 3:
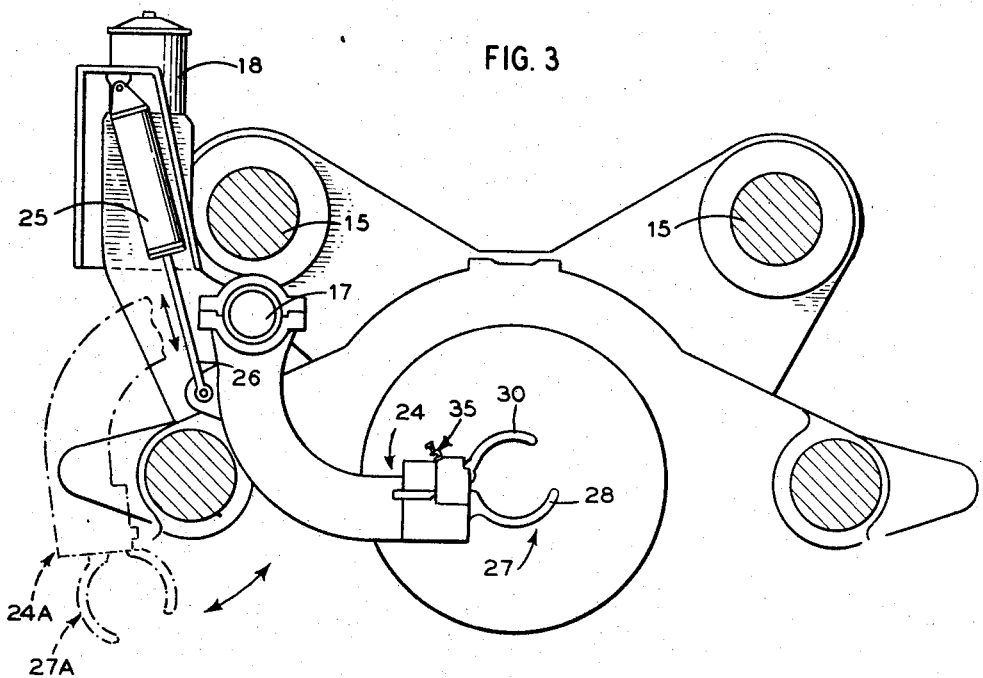
Figure 4:
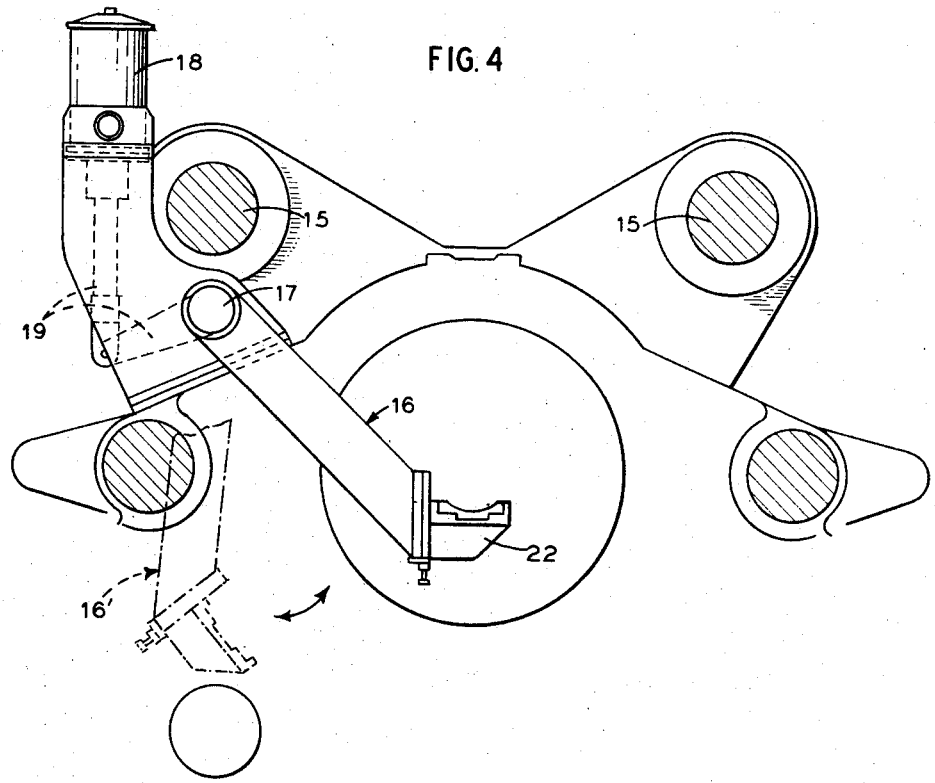
Figure 6:
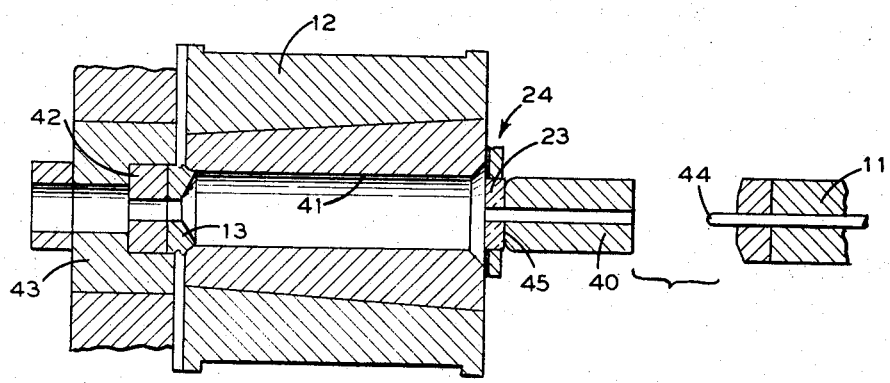
Figure 7:
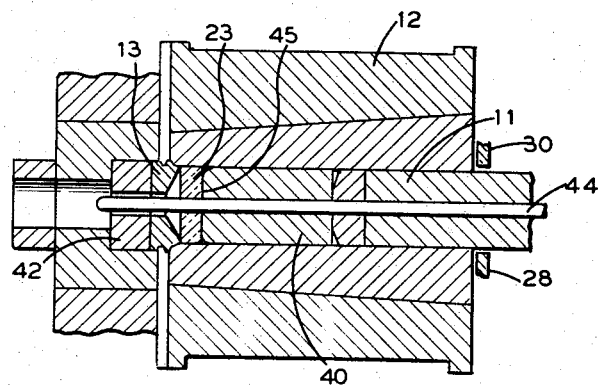

Of the drawings:
FIG. 1 is a plan view of a portion of an extrusion press incorporating the present invention;
FIG. 2 is an elevation corresponding to the extrusion press portion shown in FIG. 1;
FIG. 3 is a section taken on line 3—3 of FIG. 2;
FIG. 4 is a section taken on line 4—4 of FIG. 2;
FIG. 5 is an enlarged end view of the disc holder of FIG. 3;
FIGS. 6, 7 and 8 are schematic views, partly in section, showing progressive stages in the extrusion of a billet utilizing the present invention.

The construction and arrangement of extrusion presses are generally well known and include a die, an extrusion chamber which is intended to contain the billet to be extruded and a power piston provided to push the billet through the die to form the extruded product. The press construction and the arrangement of component parts may differ due to changes in the size and capacity of the press assembly and to the type of material being extruded.

In the drawings, an extrusion press is shown for the production of tubes or solid shapes from high temperature metals such as carbon and alloy steels. In the extrusion of high temperature metals, various forms of glass lubricants are used to provide a protective and lubricating film between the work piece and the tools.

As shown in FIGS. 1 and 2, the hydraulic cylinder is indicated generally at 10, with the piston ram 11 thereof movable in a horizontal direction toward and away from a container or extrusion chamber 12. The chamber 12 is mounted for limited horizontal movement toward and away from the fixed position of a die 13 (see FIGS. 6, 7 and 8) for access to and replacement of the extrusion die 13. It will be understood the hydraulic cylinder 10 and the die 13 including the extrusion chamber 12 are suitably supported on a framework indicated in part by the elements 15.

In the extrusion press arrangement shown the billet to be extruded into a tube is pierced, heated to a desirable working temperature, coated with a suitable lubricant in a manner well known and delivered to a handling arm 16. The arm 16 is pivotable about a shaft 17 by action of a power piston 18 acting through a linkage 19, and when the billet (not shown) has been delivered thereto, will be operated to position the billet in axial alignment with the chamber 12. In addition, the positioning of the billet is such as to provide a definite minimum space between the face 20 of the extrusion chamber and the inner end 21 of the carrier 22 of the arm 16 with the billet thereon, all as hereinafter described in connection with the operation of the press.

As is well known in the extrusion of steel and high temperature metals, a glass lubricating plug or disk 23 of the kind disclosed in U.S. Patent 2,946,437 is inserted in the extrusion chamber 12 between the die and the forward end of the billet to protect the die during the extrusion of metal therethrough. In the present invention I have found that the glass disk 23 can be positioned by a mechanical device 24 between the extrusion chamber 12 and the billet so that the movement of the device 24 is restricted to a single plane. As shown in FIG. 3, the device 24 is pivoted about the shaft 17, operated by a power piston 25 connected through piston rod 26 so as to move through the arc of a circle. The device 24 includes a gripping hand 27 having a fixed position lower jaw 28 and a movable upper jaw 30. The hand 27 may be constructed as shown in FIG. 3 or may be of the form of FIG. 5. In the FIG. 5 version the fixed jaw 28' may be constructed in the form of a block having its upper surface 31 contoured as the segment of a circle with a shoulder 32 formed therein to retain the disk in an upright position. The jaw 30' may be opened by forcing the arm 33 downwardly about the pivot 34 against the force exerted by the tension spring 39. An adjustable stop 36 limits the closing of the jaw 30 to aid in loading the disk 23 and is used as a safety feature to prevent severe crushing of the disk.

The sequential operation of an extrusion press incorporating the present invention is illustrated in FIGS. 6 to 8 inclusive. In FIG. 6 a billet 40 is schematically shown located in axial alignment with the bore 41 of the extrusion chamber 12, as positioned by the arm 16 (omitted for clarity in this view). As previously described the billet 40 will be at proper working temperature and coated with a layer of suitable lubricating material. The disk 23 will also be positioned in axial alignment with both the billet and the chamber, being so located by the mechanical device 24 and its associated hand 27. The arrangement of the chamber 12 in its relationship to the die holder 42 and the dieblock 43 is of conventional construction.

Since in the illustrated embodiment of the invention the extrusion press is arranged for the production of extruded hollow tubes, the ram 11 is provided with a mandrel 44 which is moved in a cooperative relationship with the ram. With the ram 11 advanced to push the billet 40 into the chamber 12 the initial contact between the leading face 45 of the hot billet 40 and the disk 23 will tend to adhere and be at least lightly attached to the billet, so that disk 23 and the billet will enter the extrusion chamber 12 with the disk maintained in an upright and properly centered position.

As shown in FIG. 7, the billet 40 has been advanced into the chamber with the disk 23 now moved into contact with the face of the die 42. The mandrel 44 has been extended through the die so that as the ram 11 continues to move toward the die the metal will be extruded through the die and around the mandrel to form a tube.

As shown in FIG. 8, the billet 40 has been partially extruded and an external tube 50 is being formed. The disk 23 has been partially used with the viscous lubricant conforming to the shape of the face of the die 13, and continuously providing a film of lubricant between the die and the extruded tube. The procedure is continued until the extrusion is completed, the residue removed and the plunger withdrawn, with the cycle repeated to form the succeeding extrusion.

During the extrusion cycle the limitation on the holding pressure of the spring 30 in a retaining assembly 35 in FIG. 3 and 35' in FIG. 5 permits the retention of the disk 23 in the jaws until the face of the billet just pushes the disk into the extrusion chamber. At this time the device 24 retracts to position 24a in FIG. 3 or 16' in FIG. 4. The jaw 30 is permitted to open sufficiently to clear the billet during the retraction. In the position 24a, in FIG. 3, a new disc 23 is inserted in the jaws 27A for the next succeeding extrusion cycle.

Advantageously, the mechanical placement and positioning of the lubricating disk saves time in the extrusion cycle and eliminates a dangerous manual procedure for properly positioning the lubricating disk. Experience has shown that while the time saved in using the mechanical placement of the disc may be a matter of seconds, in the overall extrusion cycle the time saving will be over 10%. When using high capital investment equipment, such as an extrusion press, a savings in time increases the production rate of the equipment with a reduction in the unit production cost and can be of real economic value.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. In the extrusion of metal billets, the combination comprising means defining an extrusion chamber, billet carrier operable to receive a heated billet and to position said billet in charging relation to the other end of said extrusion chamber, arm means for positioning a lubricating disk between the other end of said extrusion chamber and said billet in its charging position, ram means for pushing said billet and said disk through said extrusion chamber and to extrude said billet through said die, and means for moving said disk positioning arm means away from said ram means when the latter pushes the billet through said container.

2. In the extrusion of metal billets, the combination comprising means defining an extrusion chamber, a die positioned in one end of said chamber, a movable billet carrier operable to receive a heated billet and to position said billet in a charging position adjacent the other end of said extrusion chamber and in alignment therewith, arm means rotatable about a fixed axis spaced from said extrusion chamber and parallel to the axis thereof for positioning a disk of agglomerated glass between the other end of said extrusion chamber and said billet in its charging position, and ram means for pushing said billet and said disk into said extrusion chamber and to extrude said billet through said die.

3. In the extrusion of metal billets, the combination comprising means defining an extrusion chamber, a die positioned in one end of said chamber, a movable billet carrier operable to receive a heated billet and to position said billet in charging relation to the other end of said extrusion chamber, arm means for positioning a disk of agglomerated glass between the other end of said extrusion chamber and said billet in its charging position, ram means for pushing said billet and said disk into said extrusion chamber and to extrude said billet through said die, and means for moving said arm into disk receiving position away from said extrusion chamber.

4. Extrusion apparatus wherein an extrusion chamber is provided with an extrusion die at one end of the chamber and the opposite end of the chamber is open, means for moving a hot prepared billet into axially aligned position relative to the open end of said extrusion chamber, arm means for positioning a lubricating disk in axial alignment with said extrusion chamber and said billet in closely spaced relationship to and between the open end of said chamber and the adjacent end of said billet, and means for advancing an extrusion head to simultaneously push said billet and said lubricating disk into said extrusion chamber, the initial and subsequent contact between said hot billet and said disk causing the disk to stick to the billet during advancement of the billet into said chamber, means for continuing the advance of said head to extrude the billet through said die with the disk positioned against said die to provide lubrication between the die and the billet during extrusion, and means for moving said arm means into a disk receiving position spaced from said extrusion chamber.

References Cited

UNITED STATES PATENTS

| | | | |
|---|---|---|---|
| 2,538,917 | 1/1951 | Sejournet et al. | 72—253 |
| 2,946,437 | 7/1960 | Edgecombe | 72—253 |

RICHARD J. HERBST, *Primary Examiner.*

H. D. HOINKES, *Assistant Examiner.*